United States Patent
Shao et al.

(10) Patent No.: US 9,985,870 B2
(45) Date of Patent: May 29, 2018

(54) NETWORK SERVICE METHOD AND SYSTEM BASED ON SOFTWARE DEFINED NETWORKING

(71) Applicant: NANNING FUGUI PRECISION INDUSTRIAL CO., LTD., Nanning (CN)

(72) Inventors: Bo-Run Shao, New Taipei (TW); Shih-Neng Lin, New Taipei (TW); Chia-Wei Yuan, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 0 days. days.

(21) Appl. No.: 15/222,982

(22) Filed: Jul. 29, 2016

(65) Prior Publication Data
US 2018/0034723 A1 Feb. 1, 2018

(51) Int. Cl.
| | |
|---|---|
| G06F 11/00 | (2006.01) |
| H04J 1/16 | (2006.01) |
| H04L 1/00 | (2006.01) |
| H04L 12/26 | (2006.01) |
| H04L 12/727 | (2013.01) |
| H04L 12/715 | (2013.01) |
| H04L 29/06 | (2006.01) |
| H04L 12/721 | (2013.01) |
| H04L 12/707 | (2013.01) |
| H04L 12/751 | (2013.01) |
| H04N 7/15 | (2006.01) |
| H04N 7/14 | (2006.01) |

(52) U.S. Cl.
CPC ............ *H04L 45/121* (2013.01); *H04L 45/02* (2013.01); *H04L 45/22* (2013.01); *H04L 45/38* (2013.01); *H04L 45/64* (2013.01); *H04L 65/403* (2013.01); *H04L 65/608* (2013.01); *H04N 7/147* (2013.01); *H04N 7/15* (2013.01)

(58) Field of Classification Search
CPC ..... H04L 45/121; H04L 65/608; H04L 45/02; H04L 45/38; H04L 65/403; H04L 45/64; H04L 45/22; H04N 7/147; H04N 7/15
USPC ....... 370/252, 254, 255, 217, 218, 219, 220, 370/221, 223, 224, 225, 227, 228
See application file for complete search history.

(56) References Cited

U.S. PATENT DOCUMENTS

| | | | | |
|---|---|---|---|---|
| 8,665,834 B2 * | 3/2014 | Lee | ...................... | H04B 7/0695 370/334 |
| 9,634,867 B2 * | 4/2017 | Lee | ...................... | H04L 12/6418 |
| 9,736,053 B2 * | 8/2017 | Zhang | ...................... | H04L 45/02 |
| 9,871,719 B2 * | 1/2018 | Lee | ...................... | H04L 41/12 |

(Continued)

FOREIGN PATENT DOCUMENTS

| | | |
|---|---|---|
| CN | 101163072 | 4/2008 |
| CN | 103179046 A | 6/2013 |
| CN | 103326946 A | 9/2013 |

*Primary Examiner* — Chuong T Ho
(74) *Attorney, Agent, or Firm* — ScienBiziP, P.C.

(57) ABSTRACT

A network service method based Software Defined Networking (SDN) assigns forwarding devices according to network addresses and identification of a client and provides the client with an optimum route according to user requirements and current network states. A continuous monitoring process is continuously performed for route optimization based on network states, topology variations, and user feedbacks.

20 Claims, 7 Drawing Sheets

(56) References Cited

U.S. PATENT DOCUMENTS

| | | | |
|---|---|---|---|
| 2007/0286069 A1* | 12/2007 | Xu | H04L 41/0677 370/218 |
| 2011/0032881 A1* | 2/2011 | Lee | H04B 7/0695 370/328 |
| 2011/0205885 A1* | 8/2011 | Kini | H04L 12/437 370/217 |
| 2013/0242804 A1* | 9/2013 | Yabusaki | H04L 41/0893 370/255 |
| 2015/0124583 A1* | 5/2015 | May | H04L 67/28 370/217 |
| 2015/0281076 A1* | 10/2015 | Zhang | H04L 45/64 370/392 |
| 2015/0319078 A1* | 11/2015 | Lee | H04L 12/6418 370/392 |
| 2016/0254984 A1* | 9/2016 | Tekalp | H04L 45/02 709/242 |
| 2017/0141995 A1* | 5/2017 | Lee | H04L 45/02 |
| 2017/0187609 A1* | 6/2017 | Lee | H04L 45/12 |

* cited by examiner

|      | R1 | R2 | R3 | R4 |
|------|----|----|----|----|
| T1(30) | X  | 20 | X  | 25 |
| T2(20) | 10 | X  | 25 | X  |
| T3(35) | X  | 20 | X  | X  |
| T4(40) | 30 | X  | X  | X  |

NETWORK SERVICE METHOD AND SYSTEM BASED ON SOFTWARE DEFINED NETWORKING

FIELD

The subject matter herein generally relates to network service optimization.

BACKGROUND

Software Defined Networking (SDN) is an approach to computer networking that allows network administrators to manage network services through higher-level functionality. This is done by decoupling the system that makes decisions about where traffic is sent (the control plane) from the underlying systems that forward traffic to the selected destination (the data plane). The control plane communicates with the data plane via the OpenFlow protocol.

A hybrid SDN network utilizes both legacy hardwired switches and software programmable switches that use SDN protocols. This mixed mode of operation is found as service providers migrate from legacy networks to SDN technology. However, optimum routes cannot be offered by a global view under the hybrid SDN network that cannot manage new types of applications, such as high definition video conferences.

With respect to existing routing methods, managers have to manually configure settings of each of routers via complicated user interfaces. Thus, a method of automatically generating optimum routes is required.

BRIEF DESCRIPTION OF THE DRAWINGS

Implementations of the present technology will now be described, by way of example only, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one."

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series and the like.

Figure 1:
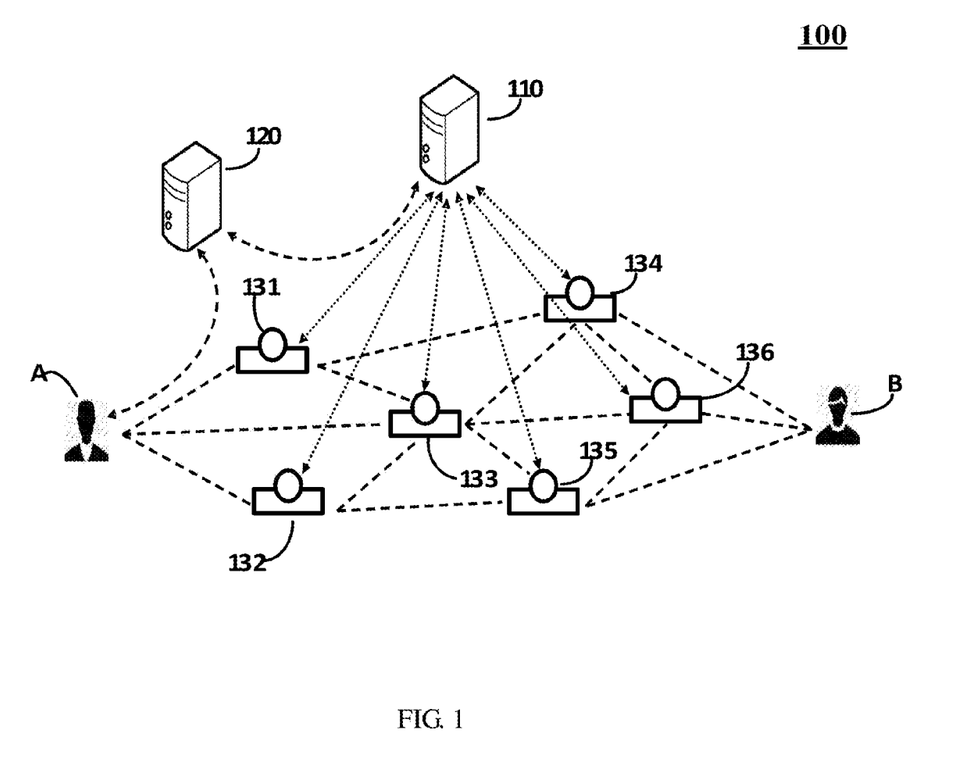
FIG. 1 illustrates a diagrammatic view of an embodiment of an SDN network service system.

FIG. 1 illustrates an embodiment of an SDN network service system 100. The system 100 comprises an SDN controller 110, a conference manager 120, multiple forwarding devices 131-136 complying with an OpenFlow protocol, and at least client A and client B. The multiple forwarding devices 131-136 are network appliances.

Figure 2:
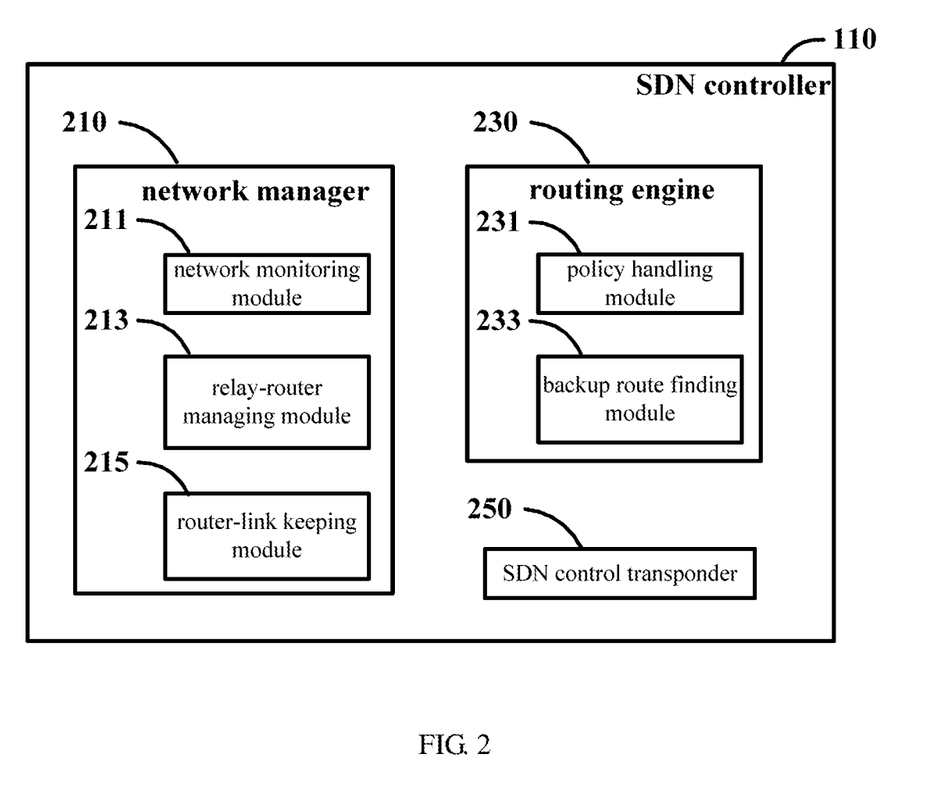
FIG. 2 illustrates a block diagram of an embodiment of functional modules of an SDN controller.

FIG. 2 illustrates an embodiment of function modules of the SDN controller 110. The SDN controller 110 comprises a network manager 210, a routing engine 230, and an SDN control transponder 250. The network manager 210 comprises a network monitoring module 211, a relay-router managing module 213, and a router-link keeping module 215. The routing engine 230 comprises a policy handling module 231 and a backup route finding module 233.

Figure 7:
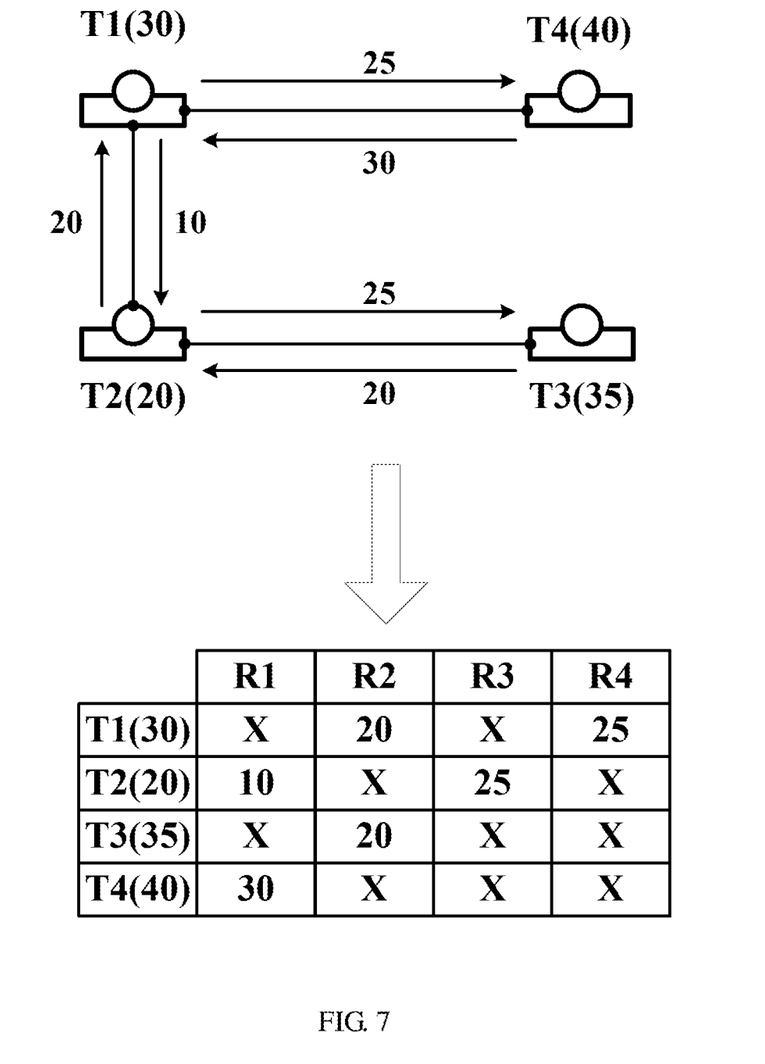
FIG. 7 illustrates an embodiment of a router-link matrix table.

The network monitoring module 211 establishes network topologies information and monitors a status of the network to update the information and the status to a router-link matrix table at all times. The router-link matrix table is shown in FIG. 7.

The relay-router managing module 213 processes information of a set of forwarding devices and transmits the information of the set of forwarding devices to the routing engine 230. A forwarding device is returned to the clients. The relay-router managing module 213 also dynamically changes a route or adjusts quality of video data streams according to returned RTCP packets.

The routing engine 230 calculates the route according to priorities of different clients. That is to say, the routing engine 230 calculates corresponding router-link (RL) values according to identities of the clients, and a packet flow redirection mechanism is triggered accordingly. The backup route finding module 233 periodically calculates backup routes, continuously updates the backup routes through combinations of different relay routers, and triggers the packet flow redirection mechanism when a better route is found.

Figure 3:
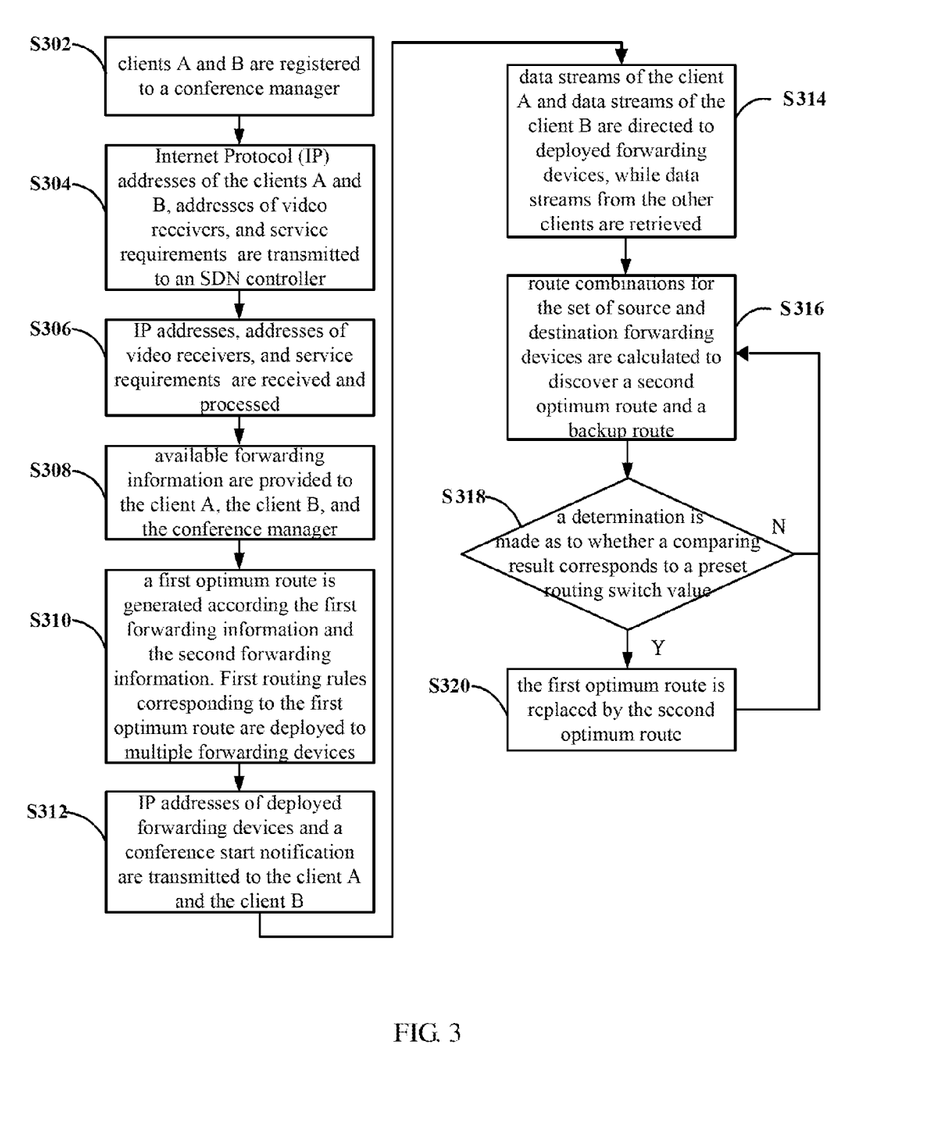
FIG. 3 illustrates a flowchart of an embodiment of an SDN network service method which is applied to a hybrid network including a traditional network architecture and an SDN network architecture.

FIG. 3 illustrates an embodiment of an SDN network service method which is applied to a hybrid network with a traditional architecture and an SDN architecture.

At block 302, a client A and a client B are registered to a conference manager.

At block 304, Internet Protocol (IP) addresses of the client A and the client B, the addresses of video receivers, and service requirements of the client A and the client B are transmitted to an SDN controller via the conference manager.

At block 306, the clients A and B IP addresses, and the IP addresses of the video receivers and the service requirements are received via the SDN controller. This information is and processed via a policy handling module 231 for providing currently available forwarding information, for example, a first forwarding information and a second forwarding information respectively relevant to the client A and the client B.

Referring to FIG. 7, forwarding devices 131, 132, 133, and 134 are represented by T1, T2, T3, and T4. T1(30) for example indicates that resource quantity of the forwarding device 131 is equal to 30, the others (132,133, and 134) can be represented in the same way.

At block 308, the first forwarding information and the second forwarding information are transmitted via the SDN controller to the client A, the client B, and the conference manager.

At block 310, a first optimum route is generated according the first forwarding information and the second forwarding information via the SDN controller. First routing rules corresponding to the first optimum route are deployed to multiple forwarding devices (131-136) via an SDN control transponder.

When the client A needs to transmit designated data streams to the client B, a routing engine 230 generates an optimum route for the client A. The optimum route is generated according to the first forwarding information of the client A and the router-link values (e.g. the resource quantity), recorded in a router-link matrix table of the forwarding devices (131-136).

At block 312, IP addresses of deployed forwarding devices and a conference start notification are transmitted to the client A and the client B via the conference manager.

At block 314, data streams of the client A and data streams of the client B are directed to deployed forwarding devices via their own network video receivers, while data streams from the other clients are retrieved by the client A and the client B.

At block 316, a set of source and destination forwarding devices are obtained according to the first forwarding information and the second forwarding information via a relay-router management module and a backup route finding module, and route combinations for the set of source and destination forwarding devices are calculated to discover a second optimum route and a backup route between the client A and the client B. The backup route is a current backup route between the client A and the client B.

A network monitoring module 211 maintains and updates contents of the router-link matrix table. The routing engine 230 regularly obtains router-link values of the forwarding devices (131-136) to calculate and update backup routes and optimum routes between each of the forwarding devices.

At block 318, the first optimum route is compared with the second optimum route via the SDN controller to determine whether a result of comparison corresponds to a preset routing switch value.

The preset routing switch values are set based on the RL values and can be manually changed by configurations of the SDN controller. The RL values initially configured include a minimum recommended value. The minimum recommended value prevents the user from setting a very low value that causes over frequent replacements of the routes.

At block 320, the first optimum route is replaced by the second optimum route when the result of comparison corresponds to the preset routing switch value. The process then proceeds to the block 316.

When the result of comparison corresponds to the preset routing switch value, the SDN controller assigns the second optimum route as a current transmission route. That is to say, the first optimum route is replaced by the second optimum route. The first optimum route is preserved via a router-link keeping module 215 and is used to replace the previous backup route to become a current backup route.

Figure 4:
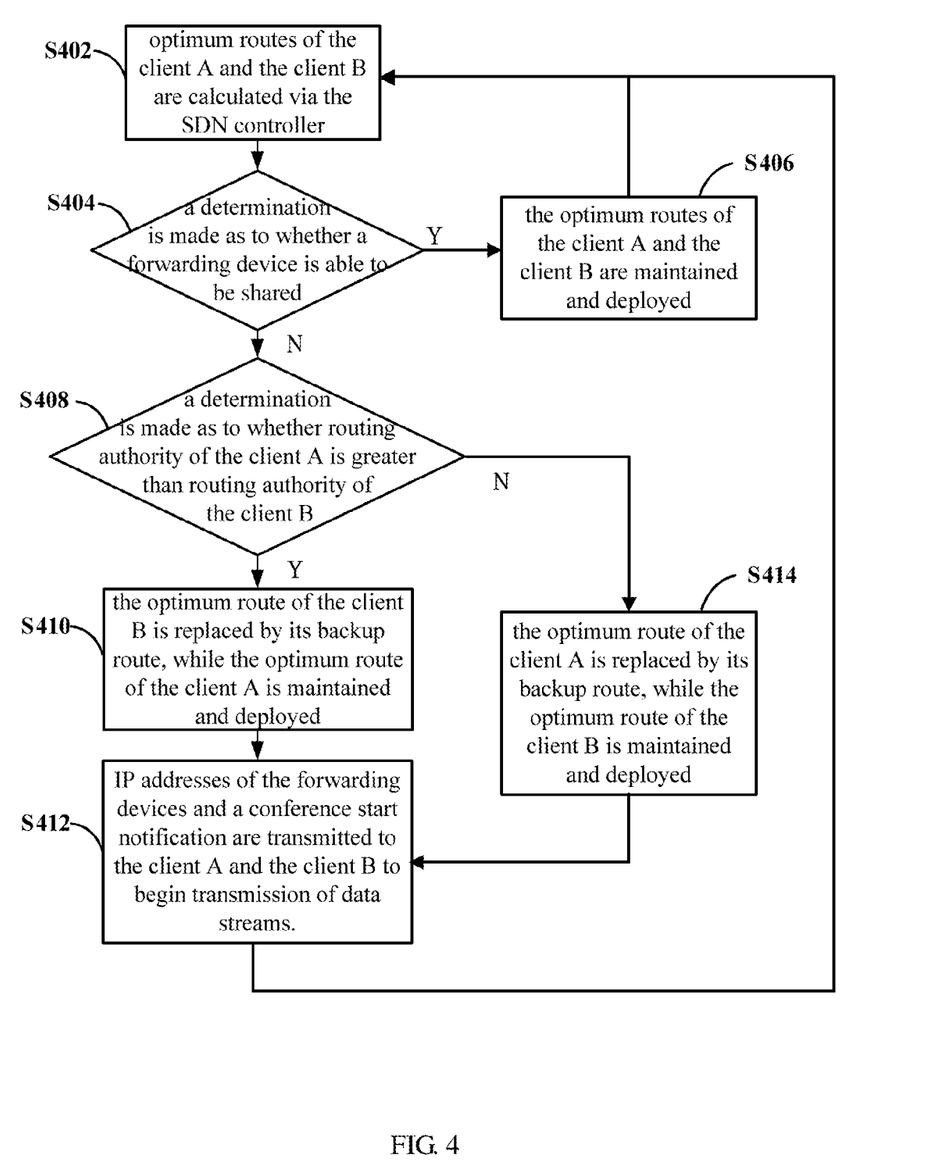
FIG. 4 illustrates a flowchart of another embodiment of an SDN network service method, which ensures transmission quality according to user identities and routing authorization.

FIG. 4 illustrates another embodiment of an SDN network service method, which ensures transmission quality according to user identities and routing authorization.

At block 402, optimum routes of known clients, for example, the client A and the client B, are calculated via the SDN controller.

At block 404, a determination is made as to whether a forwarding device is able to be shared when that forwarding device is assigned to both the client A and client B.

At block 406, the optimum routes of the client A and the client B are maintained and deployed when it is determined that the forwarding device is able to be shared.

At block 408, a determination is made as to whether routing authority of the client A is greater than routing authority of the client B when the forwarding device is unable to be shared.

At block 410, when the routing authority of the client A is greater than the routing authority of the client B, the optimum route of the client B is replaced by its backup route, while the optimum route of the client A is maintained and deployed.

At block 412, IP addresses of the forwarding devices deployed in the first optimum route and the second optimum route and a conference start notification are transmitted to the client A and the client B via the conference manager to begin transmission of data streams.

At block 414, when the routing authority of the client A is not greater than the routing authority of the client B, the optimum route of the client A is replaced by its backup route, while the optimum route of the client B is maintained and deployed. The process then proceeds to the block 412.

Figure 5:
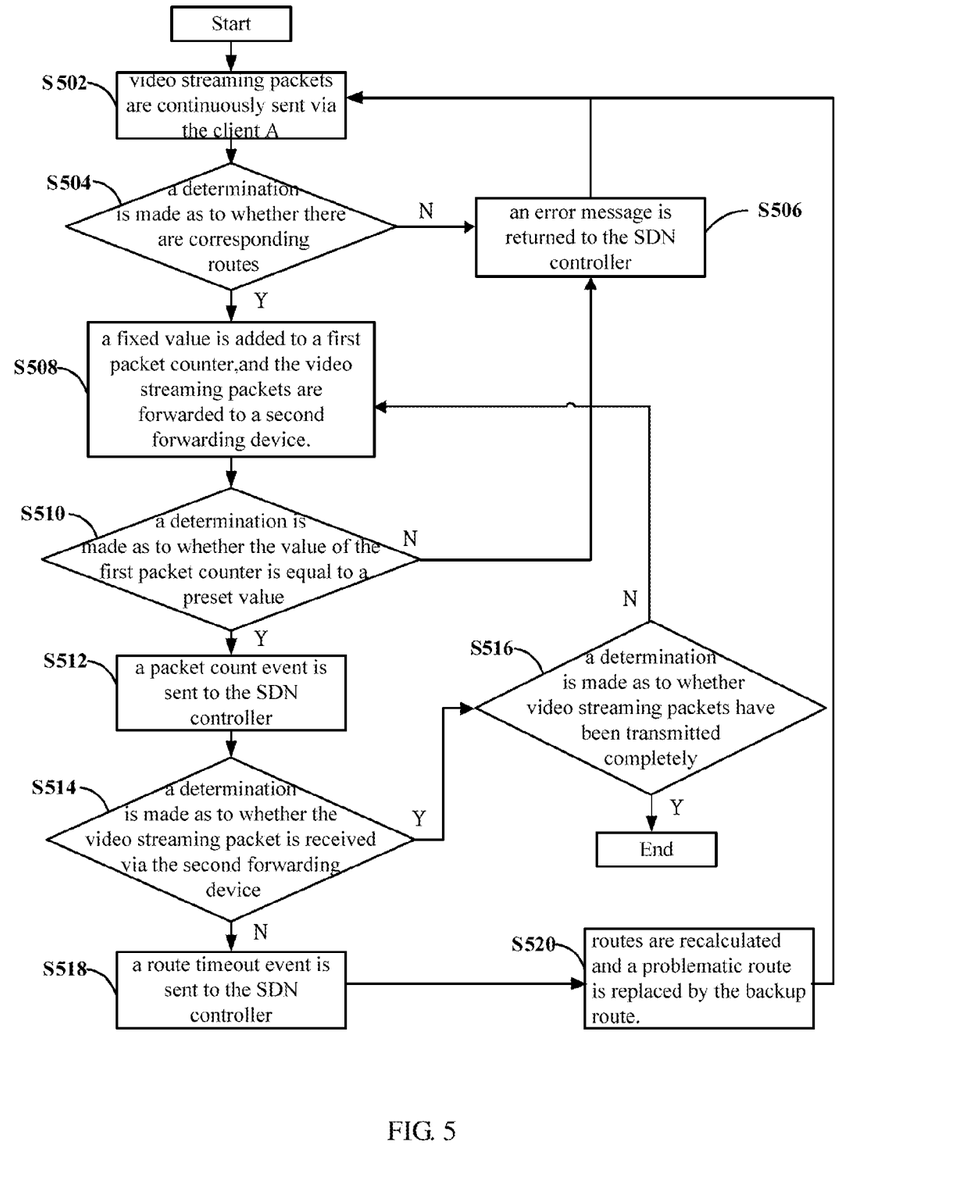
FIG. 5 illustrates a flowchart of another embodiment of an SDN network service method, which dynamically detects states of network topologies according to video data streams of users.

FIG. 5 illustrates a flowchart of another embodiment of an SDN network service method, which dynamically detects states of network topologies according to video data streams of users.

At block 502, video streaming packets are continuously sent via a sender client A after an optimum route is established and deployed.

At block 504, when a video streaming packet from the client A reaches a first forwarding device (for example, the first forwarding device 132), the first optimum route transmitting the video streaming packets is compared with routes recorded in a first routing table of the first forwarding device to determine whether there are corresponding routes.

At block 506, an error message is returned to the SDN controller via the first forwarding device to redeploy routes, if there is no corresponding route.

At block 508, if there is at least one corresponding route, a fixed value (for example, 1) is added to a first packet counter (Packet_Count=Packet_Count+1) of the first optimum route and a first timeout value of the first optimum route is reset to zero, while the video streaming packet is forwarded to a second forwarding device.

At block 510, a determination is made as to whether the value of the first packet counter is equal to a preset value.

At block 512, a packet count event is sent to the SDN controller if the value of the first packet counter is equal to the preset value;

At block 514, a determination is made as to whether the video streaming packet is received by the second forwarding device.

At block 516, if the video streaming packet is received by the second forwarding device, a determination is made as to whether video streaming packets transmitted from the sender client A to a receiver client B have been transmitted completely. If there are video stream packets need to be transmitted, the process then proceeds to the block 508, or is terminated.

At block 518, if the video streaming packets are not transmitted to the second forwarding device within a first preset time (due to broken link or other factors), a router timeout event is sent to the SDN controller by the second forwarding device.

At block 520, when the router timeout event is received, the routing engine is notified via the SDN controller to recalculate routes and to replace the route currently in use with the backup route.

In addition, when the packet counter event is received, the SDN controller calculates an average time for transmission of the video streaming packets from the first forwarding device to the second forwarding device and updates the average time to the router-link matrix table.

Figure 6:
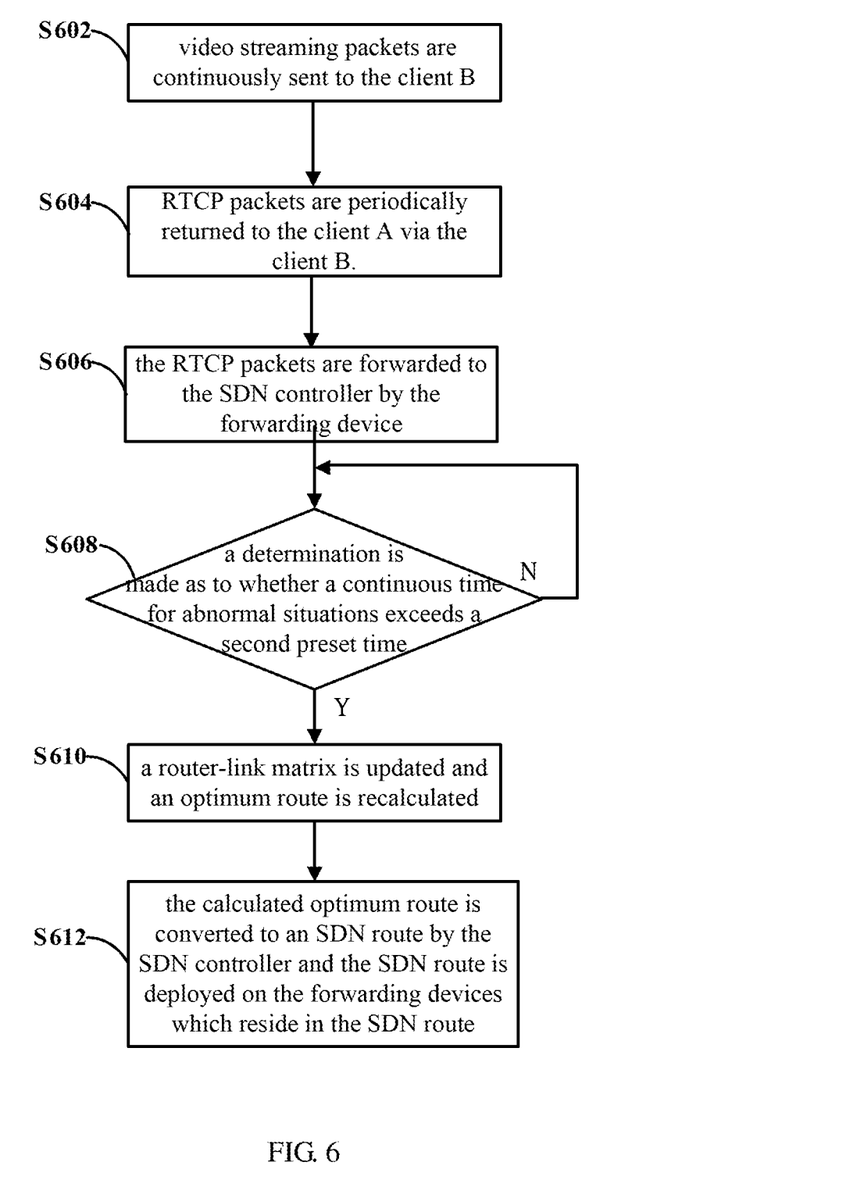
FIG. 6 illustrates a flowchart of another embodiment of an SDN network service method, which, as Real-time Transport Protocol (RTP) service is implemented, dynamically changes routes or adjusts quality of video data streams according to returned Real-time Transport Control Protocol (RTCP) packets.

FIG. 6 illustrates another embodiment of an SDN network service method, which, as RTP service is implemented, dynamically changes routes or adjusts quality of video data streams according to returned RTCP packets.

Traditional RTCP packets comprise the number of received packets, lost packets, and other statistical information. However, RTCP packets only have the function of being transmitted between endpoints to provide traffic controls and congestion controls, routing controls cannot be implement by the packets themselves. When the SDN controller is introduced, if a service is provided through transmitting RTCP packets, the forwarding devices can forward the RTCP packets transmitted from a receiver to the SDN controller via SDN routes.

At block 602, video streaming packets are continuously sent to the receiver client B by the sender client A, after the route is established and deployed.

At block 604, RTCP packets are periodically returned to the client A via the client B.

At block 606, if an RTCP route is created for a forwarding device between the client A and the client B, the RTCP packets are forwarded to the SDN controller by the forwarding device when the RTCP packets are received.

At block 608, statistical information relating to the RTCP packets is analyzed via the SDN controller to determine whether a continuous time for abnormal situations exceeds a second preset time. For example, a determination is made as to whether a packet loss ratio is greater than a critical value and, if greater than the critical value, whether a continuous time for the packet loss ratio exceeds a second preset time.

At block 610, when the continuous time for abnormal situations exceeds the second preset time to indicate poor routing quality of a current route, (for example, a current route between the client A and the client B), the router-link matrix is updated via the SDN controller and the routing engine is asked to recalculate an optimum route between the client A and the client B according to the updated router-link matrix.

At block 612, the calculated optimum route is converted to an SDN route by the SDN controller and the SDN route is deployed on the forwarding devices which reside in the SDN route. The video streaming packets can be sent constantly with good transmission quality to the client B.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and be protected by the following claims.

What is claimed is:

1. A network service method based on Software Defined Networking (SDN), the method comprising:
registering a first client and a second client to a conference manager;
transmitting Internet Protocol (IP) addresses of the first client and the second client, video receiver addresses, and service requirements of the first client and the second client to an SDN controller;
analyzing the received IP addresses, video receiver addresses, and service requirements to generate first forwarding information for the first client and second forwarding information for the second client;
replying the first forwarding information and the second forwarding information to the first client, the second client and the conference manager;
generating a first optimum route based on the first forwarding information and the second forwarding information and deploying first routing rules corresponding to the first optimum route on multiple forwarding devices;
informing the first client and the second client addresses of the forwarding devices and a conference start notification;
directing first data streams from the first client and second data streams from the second client to the forwarding devices and, in the meanwhile, directing data streams from other clients to the first client and the second client;
obtaining a set of source and destination forwarding devices based on the first forwarding information and the second forwarding information;
calculating route combinations of the set of source and destination forwarding devices to discover a backup route, between the first client and the second client, and a second optimum route;
comparing the first optimum route and the second optimum route to determine whether result of comparison corresponds to a preset routing switch value; and replacing the first optimum route by the second optimum route, when the result of comparison corresponds to the preset routing switch value, and transmitting designated data streams via the second optimum route and replacing the backup route by the first optimum route to be a current backup route.

2. The method as claimed in claim 1, further comprising:
when the first client is going to transmit the designated data streams to the second client, generating the first optimum route according to router-link values of the forwarding devices, which are recorded in a router-link matrix, and the first forwarding information.

3. The method as claimed in claim 2, further comprising:
periodically retrieving the router-link values from the router-link matrix to calculate and update backup routes and optimum routes between the forwarding devices.

4. The method as claimed in claim 3, wherein the preset routing switch values are determined based on the router-link values of the router-link matrix.

5. The method as claimed in claim 1, further comprising:
calculating the first optimum route for the first client and the second optimum route for the second client;
determining whether a first forwarding device is able to be shared when the first forwarding device is involved in both of the first optimum route and the optimum second route;
deploying the first optimum route for the first client and the second optimum route for the second client when the first forwarding device is able to be shared;
determining whether authority of the first client is greater than authority of the second client;
when the authority of the first client is greater than the authority of the second client, replacing the second optimum route by a second optimum route for the second client and maintaining and deploying the first optimum route for the first client; and
informing the first client and the second client the addresses of the forwarding devices deployed in the first optimum route and the second optimum route and a conference start notification.

6. The method as claimed in claim 5, further comprising:
when the authority of the first client is not greater than the authority of the second client, replacing the first optimum route by a first optimum route for the first client and maintaining and deploying the second optimum route for the second client.

7. The method as claimed in claim 1, further comprising:
when a video streaming packet from the first client reaches a second forwarding device, comparing the first optimum route transmitting the video streaming packet with routes recorded in a first routing table of the second forwarding device to determine whether there are corresponding routes;
returning an error message to the SDN controller via the second forwarding device, if there is no corresponding route, to redeploy routes; and
if there is at least one corresponding route, adding a first packet counter of the first optimum route by a fixed value, resetting a first timeout value of the first optimum route to zero, and forwarding the video streaming packet to a third forwarding device.

8. The method as claimed in claim 7, further comprising:
determining whether the value of the first packet counter is equal to a preset value;
sending a packet count event, via the second forwarding device, to the SDN controller if the value of the first packet counter is equal to the preset value;
determining whether the third forwarding device receives the video streaming packet;
sending a route timeout event, via the third forwarding device, to the SDN controller if the third forwarding device does not receive the video streaming packet within a first preset time; and
recalculating routes, when the second forwarding device receives the video streaming packet, and replacing the first optimum route by a third backup route.

9. The method as claimed in claim 8, further comprising:
when the packet count event is received from the second forwarding device, calculating an average time of transmitting the video streaming packet from the second forwarding device to the third forwarding device, and updating the average time to the router-link matrix.

10. The method as claimed in claim 1, further comprising:
periodically returning Real-time Transport Control Protocol (RTCP) packets to the first client;
creating an RTCP route on a fourth forwarding device between the first client and the second client;
forwarding the RTCP packets to the SDN controller when the fourth forwarding device receives the RTCP packets;
analyzing statistical information of the RTCP packets and determining whether a continuous time for abnormal situations exceeds a second preset time;
when the continuous time for abnormal situations exceeds the second preset time, updating the router-link matrix and recalculating a third optimum route between the first client and the second client according to the router-link matrix; and
converting the third optimum route to an SDN route and deploying the SDN route on forwarding devices residing in the SDN route.

11. A network service system based on Software Defined Networking (SDN), comprising:
at least one processor;
a storage unit; and
one or more programs that are stored in the storage unit and to be executed by the at least one processor, the one or more programs comprising instructions for:
registering a first client and a second client to a conference manager;
transmitting Internet Protocol (IP) addresses of the first client and the second client, video receiver addresses, and service requirements of the first client and the second client to an SDN controller;
analyzing the received IP addresses, video receiver addresses, and service requirements to generate first forwarding information for the first client and second forwarding information for the second client;
replying the first forwarding information and the second forwarding information to the first client, the second client and the conference manager;
generating a first optimum route based on the first forwarding information and the second forwarding information and deploying first routing rules corresponding to the first optimum route on multiple forwarding devices;
informing the first client and the second client addresses of the forwarding devices and a conference start notification;
directing first data streams from the first client and second data streams from the second client to the forwarding devices and, in the meanwhile, directing data streams from other clients to the first client and the second client;

obtaining a set of source and destination forwarding devices based on the first forwarding information and the second forwarding information;

calculating route combinations of the set of source and destination forwarding devices to discover a backup route, between the first client and the second client, and a second optimum route;

comparing the first optimum route and the second optimum route to determine whether the result of comparison corresponds to a preset routing switch value; and replacing the first optimum route by the second optimum route, when the result of comparison corresponds to a preset routing switch value, and transmitting designated data streams via the second optimum route and replacing the backup route by the first optimum route to be a current backup route.

12. The system as claimed in claim 11, further comprising instructions for:

when the first client is going to transmit the designated data streams to the second client, generating the first optimum route according to router-link values of the forwarding devices, which are recorded in a router-link matrix, and the first forwarding information.

13. The system as claimed in claim 12, further comprising instructions for:

periodically retrieving the router-link values from the router-link matrix to calculate and update backup routes and optimum routes between the forwarding devices.

14. The system as claimed in claim 13, wherein the preset routing switch values are determined based on the router-link values of the router-link matrix.

15. The system as claimed in claim 11, further comprising instructions for:

calculating the first optimum route for the first client and the second optimum route for the second client;

determining whether a first forwarding device is able to be shared when the first forwarding device is involved in both of the first optimum route and the optimum second route;

deploying the first optimum route for the first client and the second optimum route for the second client when the first forwarding device is able to be shared;

determining whether authority of the first client is greater than authority of the second client;

when the authority of the first client is greater than the authority of the second client, replacing the second optimum route by a second optimum route for the second client and maintaining and deploying the first optimum route for the first client; and informing the first client and the second client the addresses of the forwarding devices deployed in the first optimum route and the second optimum route and a conference start notification.

16. The system as claimed in claim 15, further comprising instructions for:

when the authority of the first client is not greater than the authority of the second client, replacing the first optimum route by a first optimum route for the first client and maintaining and deploying the second optimum route for the second client.

17. The system as claimed in claim 11, further comprising instructions for:

when a video streaming packet from the first client reaches a second forwarding device, comparing the first optimum route transmitting the video streaming packet with routes recorded in a first routing table of the second forwarding device to determine whether there are corresponding routes;

returning an error message to the SDN controller from the second forwarding device, if there is no corresponding route, to redeploy routes; and if there is at least one corresponding route, adding a first packet counter of the first optimum route by a fixed value, resetting a first timeout value of the first optimum route to zero, and forwarding the video streaming packet to a third forwarding device.

18. The method as claimed in claim 17, further comprising instructions for:

determining whether the value of the first packet counter is equal to a preset value;

sending a packet count event, from the second forwarding device, to the SDN controller if the value of the first packet counter is equal to the preset value;

determining whether the third forwarding device receives the video streaming packet;

sending a route timeout event, via the third forwarding device, to the SDN controller if the third forwarding device does not receive the video streaming packet within a first preset time; and recalculating routes, when the second forwarding device receives the video streaming packet, and replacing the first optimum route by a third backup route.

19. The system as claimed in claim 18, further comprising instructions for:

when the packet count event is received from the second forwarding device, calculating an average time of transmitting the video streaming packet from the second forwarding device to the third forwarding device, and updating the average time to the router-link matrix.

20. The system as claimed in claim 11, further comprising instructions for:

periodically returning Real-time Transport Control Protocol (RTCP) packets to the first client;

creating an RTCP route on a fourth forwarding device between the first client and the second client;

forwarding the RTCP packets to the SDN controller when the fourth forwarding device receives the RTCP packets;

analyzing statistical information of the RTCP packets and determining whether a continuous time for abnormal situations exceeds a second preset time;

when the continuous time for abnormal situations exceeds the second preset time, updating the router-link matrix and recalculating a third optimum route between the first client and the second client according to the router-link matrix; and converting the third optimum route to an SDN route and deploying the SDN route on forwarding devices residing in the SDN route.

* * * * *